3,515,573
METHOD FOR COATING IMPREGNATED TEXTILE SUBSTRATES WITH POLYMERIC COATINGS FREE OF PITS, AIR BUBBLES, AND BLISTERS
Archie B. Japs, Akron, and Walter T. Murphy, Cuyahoga Falls, Ohio, assignors to The B. F. Goodrich Company, New York, N.Y., a corporation of New York
No Drawing. Continuation-in-part of application Ser. No. 528,381, Feb. 18, 1966. This application Mar. 28, 1969, Ser. No. 811,673
Int. Cl. D06n 3/14; B44d 1/44
U.S. Cl. 117—47
3 Claims

ABSTRACT OF THE DISCLOSURE

Textile fibrous substrate, impregnated with a synthetic polymer, is coated with a synthetic polymer solution, immersed in a bath of fluid which is a nonsolvent for said coating polymer, said bath coagulating said coating polymer and extracting the solvent therefor. Smoothness of the applied polymeric coating and freedom thereof from pits and blisters is assured by prewetting the impregnated substrate with an inert fluid such as water before applying said synthetic polymer solution.

CROSS REFERENCE TO RELATED APPLICATION

This application is a continuation-in-part of application Ser. No. 528,381 filed Feb. 18, 1966, and now abandoned.

BACKGROUND OF THE INVENTION

This invention is concerned with the formation of poromeric laminated structures that have leatherlike appearance and properties. More particularly the invention is concerned with the preparation of such a structure which is a laminate of a textile substrate and a microporous polymeric top film that has the surface smoothness of leather and is free of pits, air bubbles, and blisters.

It is known in the art to make leatherlike laminated structures comprising polymer impregnated, porous, woven or nonwoven fibrous substrates coated with a microporous polyurethane film wherein the polyurethane is a completely formed polymer which is applied to the substrate in the form of a solution or dispersion. The impregnating polymer may be a polyurethane or a vinylidene polymer, the criterion of its use and presence being that it materially fills the natural voids and interstices of the fibrous substrate material, but does not adhere to the fibers thereof. It maintains the microporous structure into which it is precipitated, and while it substantially fills voids between fibers in the fibrous substrate, there are minute openings, pores, channels and capillary formations in the structure which give it overall microporosity and ability to transpire gases such as water vapor. These openings are normally filled with air. The porous film top layer of the laminated structure may be formed separately from the impregnated substrate layer, and the two layers can then be adhered, or, preferably, the porous film may be formed in situ on the impregnated substrate layer by spreading thereon a layer of polyurethane polymer dissolved in an organic solvent which is then precipitated in the form of a microporous coating. In the latter procedure the coating solution of polyurethane polymer is prevented from penetrating the fibrous substrate by the presence of the impregnating polymer in said substrate. The textile properties of the substrate are thus protected from the destructive action of the polymer solvents thereon. The coated substrate is then floated, preferably coated side down, on a bath of an inert fluid which is a nonsolvent for the polyurethane but is miscible with the solvent for the polyurethane. The preliminary upside down flotation step initiates the formation of the microporous coating. The total structure is next immersed in a bath of inert fluid to complete the extraction of the organic solvent and coagulation of the polyurethane into a microporous configuration. The floating step is an objectionable one because a very delicate balance or mechanism is needed to successfully float the coated substrate on the surface of the fluid bath and properly control the formation of the microporous structure. When the structure is immersed in a bath of inert fluid without the initial inverted flotation step, it is found that air trapped in the impregnated fibrous substrate is forced up into the polymer coating layer by pressure exerted from below by the bath fluid. It then creates objectionable air bubbles, pits and blisters that detract from the appearance qualities of the laminated structure.

It would be desirable to find a better method whereby when a polyurethane solution is spread upon an impregnated porous fibrous substrate, the solvent can be extracted and the polymer coagulated in a microporous configuration with no evidence of pits, air bubbles and blisters in the top film caused by air that exists entrapped in the porous substrate and is subsequently either drawn or forced into the top film of coagulated polymer. The method of making the film separately and then laminating it to the substrate is objectionable because it requires extra operations and presents problems of spreading an adhesive between the layers. The adhesive region then is the area subject to development of pits and air bubbles from the air initially entrapped in the porous substrate. The presence of the impregnant polymer in the voids of the substrate prevents the solvents of coating solutions from penetrating the substrate, but it does not prevent air from being present in capillary spaces and the like throughout the substrate from where it can transfer into an applied coating in the form of air bubble imperfections which are objectionable because they produce visible surface defects in dyeing, color coating, and embossing the laminated structure.

Efforts have been made to solve this problem by prime coating the surface of the impregnated porous substrate with a solution of the same polymer to be used for the coating. This method does not work successfully for all substrates, however, and the procedure generally lowers the moisture vapor transmission (MVT) of the final composite structure. Efforts have also been made to cool or "set" the coating layer of polymer more quickly by refrigerator cooling, but these efforts have not produced a bubble-free surface.

SUMMARY OF THE INVENTION

A method has now been discovered for preventing the formation of pits and air bubbles in a microporous polyurethane top film that are caused by the escape into the top film of air previously entrapped in an impregnated porous fibrous substrate to which the top film is applied. The improved method is to prewet the impregnated porous substrate in a liquid, said liquid displacing the entrapped air before the top film polymer solution or preformed top film is applied to the substrate. When this method is used, no air is displaced from the fibrous substrate during any of the coating, laminating, coagulation, extraction, washing or drying operations. The surface obtained is smooth and free of blisters. The invention is accomplished by saturating the porous impregnated fibrous substrate in a liquid which is miscible with the polyurethane solvent, but is not itself a solvent for the polyurethane, followed by a compaction, squeeze, or wringing to remove excess surface liquid from the substrate fibers and fully to displace the entrapped air from the substrate fiber capillaries and interstices. The wetted, deaerated porous fibrous substrate may then be coated by steps known in the art to give a structure with leather-like appearance and properties.

The polymer impregnated porous substrate is immersed in the inert, polyurethane solvent miscible liquid until the substrate is saturated, which term is herein defined to mean completely wetted and with all naturally entrapped air displaced by the inert liquid saturant. The wet porous substrate then passes through squeeze rolls set tightly enough to remove excess amounts of water from all surfaces of the impregnated fabric. While still wet and saturated, the substrate is given a coating by extrusion, doctor knife application, roller-coating, brushing, spraying, or other suitable means, of the desired polyurethane polymer solution. The composite structure is immersed in the coagulation and extraction bath of inert polyurethane nonsolvent which extracts the polyurethane solvent and simultaneously coagulates the polyurethane in a microporous configuration. After drying, a microporous polymeric coating is tightly adhered to the porous textile substrate. The coating is smooth and has no bubble defects.

Unless it is in some manner removed or dissolved, air entrapped in the capillaries and interstices of impregnated porous fibrous substrate materials becomes displaced into a polyurethane polymer film solution coating applied to the substrate when the structure is immersed in a bath of inert fluid to extract the polyurethane solvent and to coagulate the polyurethane in a microporous configuration. The air movement results in bubbles, pits or blisters in the coating when the polyurethane film is coagulated in a solvent extraction bath. By displacing the trapped air and removing it before the polyurethane surface film solution is applied, the method of the invention eliminates the cause of the objectionable pits and bubbles found when prior art processes are followed.

Typical porous substrates to which the method of the invention may be applied are natural and synthetic textile fabrics, both woven and nonwoven, and natural porous materials such as low grade leather suedes and splits. The textiles may include woven twills, jersey and tricot knitted goods, felts and nonwoven webs. The fibers may be spun from polyamides, polyolefins, polyesters, viscose rayon, wool, cotton, glass and the like, or mixtures thereof.

The fibrous substrates, particularly those in the form of nonwoven batts, may be made by carding, garnetting, air-laying, water-laying and other methods known in the art. They preferably weigh about 4 to 15 ounces per square yard. Nonwoven fabrics contain randomly distributed short staple fibers. These nonwoven webs can be made in various thicknesses and densities, and are often bonded together by the application of a minor amount of binder adhesive which can be applied by spraying, immersion and similar means. Typical binder adhesives are the synthetic latices of butadiene-styrene, butadiene-acrylonitrile, and the lower alkyl acrylates, methacrylates or copolymers thereof. Binder polymer is usually present in an amount of 5% to 45% by weight of the nonwoven fiber.

A leatherlike material based on a nonwoven fibrous batt contains in addition to the binder polymer, an impregnant consisting of 50% to 200% by weight of fiber of a synthetic polymer such as butadiene-styrene copolymer, butadiene-acrylontirile copolymer, polyacrylonitrile, polybutadiene, lower alkyl polyacrylates, polyvinyl chloride, and polyurethanes prepared by the reaction of a polyester or a polyether with an aromatic diisocyanate and a chain extender containing at least two active hydrogen atoms. Carboxylic varieties of the above-mentioned materials may be used. The particular polymer is not critical to the invention. Variation in the type of impregnating polymer makes possible variations in the properties of the leather-like material produced. It is important, as shown in the prior art, that the impregnant fill the voids of the fibrous batt, but not adhere to the fibers thereof.

Leatherlike materials may be formed by impregnating nonwoven fibrous batts with one or more of the variety of materials listed above. Such materials may be sanded or buffed and dressed to further improve their appearance and hand. Standard leather buffing or sanding apparatus, equipped with silica-, emery-, aluminum oxide or carborundum coated paper is conveniently used for the smoothing step. This removes surface irregularities and improves texture. Standard leather top dressings including conventional shoe and boot polishes and pigmented polymeric latices such as mixtures of butadiene-acrylonitrile copolymers with phenylformaldehyde resins and solutions of polyurethane condensation polymers may be used.

The above leatherlike materials, comprising non-woven fibrous batts impregnated with vinylidene or addition type polymers and optionally sanded or buffed, may be further modified into other leatherlike materials by the application of a microporous polyurethane coating thereto. The appearance of air bubbles and blisters in this coating when it is formed in situ, or beneath said coating if it is applied as a preformed film, is the problem solved by the present invention.

The liquid media used to saturate the substrates include those which are nonsolvents for the polymer employed in the coating, but are miscible with the solvent therefor. Favored liquids include water, ethylene glycol, glycerol, glycol monoethyl ether, tertiary butyl alcohol, methanol, ethanol, and the like. Water is most preferred. Wetting agents such as alkyl aryl sulfonates, sulfated alcohols and quaternary ammonium halides may be added to assist in air displacement.

Organic solvents employed in the art to dissolve the polymers used to form polymer solutions for surfaces of leatherlike structures, and which are miscible with the liquid media named above include N,N'-dimethylformamide, N,N'-dimethylacetamide, dimethylsulfoxide, tetrahydrofuran, gamma-butyrolactone, acetone and methylethylketone.

The polymers employed to form the permeable top films of leatherlike structure are now well-known in the art and many are mentioned and described in U.S. Pats. 2,871,218, 2,899,411 and 3,000,757. They include polyurethanes such as those formed by chain extending a prepolymer of molecular weight 750 to 10,000 with a compound having only two active hydrogen atoms, and linear polyurethanes comprising the reaction product of a linear hydroxyl-terminated polyester or polyether with an aromatic diisocyanate and a saturated, aliphatic free glycol and characterized by the absence of free isocyanate and hydroxyl groups. Typically, the latter polyesterurethanes are prepared by reacting one mole of polyester having a molecular weight of about 600 to 1200 with about 1.1 to 3.1 moles of a diphenyl diisocyanate in the presence of about 0.1 to 2.1 moles of a glycol containing from 4 to 10 carbon atoms. The polyesters are hydroxyl terminated condensation products of 4 to 10 carbon atom alkylene glycol. Vinyl polymer such as polyvinyl chloride, polyvinylbutyral, polyacrylonitrile and copolymers thereof can also be dissolved in amounts less than 50% by weight with the polyurethanes described above. The polyurethane used in the coating step must be a completely formed polymer at the time of coating. One cannot coat the fibrous substrate with a mixture of a polyurethane prepolymer solution and a diisocyanate solution. Such a mixture of solutions in reacting to form a polyurethane will form an impermeable, non-poromeric film instead of a microporous film. The invention is concerned with the ultimate physical condition of the top film, namely, that it be microporous and free of defects caused by air entrapped in the impregnated porous substrate and then dislodged therefrom.

It is important to the practice of the invention that the porous fibrous substrate employed be saturated with the liquid, that is, that the substrate's entrapped air be replaced by the saturant. A few trials will quickly tell a skilled operator whether all the entrapped air has been displaced. After saturation of the porous substrate, any excess of liquid must be wrung from the surface of the substrate as said excess droplets will interfere with the adhesion of the polymer coating that is to be applied to the saturated substrate. Again a few trials will enable one skilled in the art to tell that he has obtained a saturated condition as opposed to a super saturated state or a state where free water droplets are still present.

DETAILED DESCRIPTION

The following examples will serve to illustrate the invention. Parts where given are parts by weight.

Example I

A linear polyesterurethane polymer is prepared by following the teaching of Pat. 2,871,218. First 1000 g. (1.0 mol) of hydroxyl poly(tetramethylene adipate), molecular weight 1000, hydroxyl number 112, acid number 2.5, and 180 g. (2.0 mols) of butanediol-1,4 are mixed in a heated autoclave with stirring for 15 minutes at 10 mm. pressure at 100° to 105° C. Next 750 g. (3.0 mols) of diphenylmethane-p,p'-diisocyanate are added and stirred for 2 minutes. The melt is poured into lubricated metal trays and held in an oven at 140° C. for 3 hours.

A solution is prepared by dissolving 100 parts of the polyesterurethane in 229.5 parts dimethylformamide (DMF). Twelve and one-half parts of a pyrogenic silica having a particle size of 0.015 micron, surface area of 200 m.$^2$ per g. and bulk density of 2.2 lbs. per cu. ft. is dispersed in 70.5 parts DMF, and two parts of glycerol is combined with 2.5 parts of octadecyl-tri-methyl ammonium chloride. The three mixtures are combined and stirred to form a smooth polymer solution which is used to coat the vinylidene polymer impregnated substrates prepared as described below.

A nonwoven batt, consisting of 60% polypropylene, 40% rayon, formed by carding and cross-laying technique from 1.5 denier, 1.5" long fibers, with a weight of 9.5 oz. per sq. yd., a thickness of 0.040", a density of 0.29 g./cc., needled to a level of 2300 punches per sq. in., is dipped in a 10% aqueous solution of sodium bicarbonate, then immersed in 35% solids, carboxyl-modified butadiene-acrylonitrile (70/30) copolymer latex containing 5% sodium bicarbonate on latex total solids. Next the batt is dipped in 5% calcium chloride to coagulate the latex, and in 5% acetic acid to remove the sodium bicarbonate. The treated batt is then washed in warm water and dried. It has a polymer pickup of 119% on weight of fabric, thickness of .045", MVT of 690 g./sq. m./24 hours, and a degree of suppleness as measured by ASTM procedure D1388–55T of 71.5 p.s.i. This batt is divided into four samples, 6" x 18", marked A through D and processed as follows.

(A) Fabric is primed with a 2-mil coating of the polymer solution. A 35 mil layer of polymer solution is spread on the fabric at 25° C. to give a dry film thickness of about 16 mils. A cold water spray is applied to both top and bottom surfaces of the freshly coated fabric to coagulate the polymer into a microporous film. The sample is immersed in water at 18° C. to fully extract the DMF and finally is dried to remove the water. The coating surface is badly blistered with air bubbles.

(B) The procedure of step A is followed except that, after coating, the sample is immersed in a bath of 50% DMF/50% water at 18° C. for 2 minutes. Next the sample is placed in an 18° C. water bath to extract DMF. After drying, the surface is blistered.

(C) The coating procedure of step A is followed except that after the water spray, the sample is cooled at −20° C. for 15 minutes. The surface is blistered and unacceptable.

(D) The fabric sample is immersed in water to saturate the fibers. Next the fabric is squeezed through wringer rolls set tightly enough to squeeze out excess water and leave no visible water droplets on the fabric. A 35-mil polymer solution coating is applied to the substrate and the coated fabric is immediately immersed in cold water (18° C.) for 2¼ minutes to coagulate the coating, then in hot water (43° C.) to extract DMF. When dry, the sample surface is smooth, microporous and shows no blisters or separations either when viewed flat or when cut and viewed in section. MVT of the sample is 600 g./m.$^2$/24 hrs.

Example II

A solution of polyesterurethane polymer in DMF is prepared as in Example I. Two 8" x 14" samples, E and F, of the vinylidene polymer impregnated nonwoven fabric described in Example I are sanded smooth on one surface on a Curtin-Herbert oscillating drum sander.

A 35-mil wet coating of polyesterurethane polymer solution prepared as in Example I is applied to the sanded surface of the fabric pieces at 25° C. The samples are then immersed in 24° C. water for 2¼ minutes followed by washing for 30 minutes in a 43° C. water bath. This bath extracts the last of the DMF and sets the coating film in its microporous structure. Finally, the samples are oven dried at 90° C.

(E) The coating is applied with the fabric swatch dry.

(F) The coating is applied after the fabric swatch is first saturated with water, then wringer-squeezed enough to remove excess water and leave no free water droplets on the fabric. The coating, setting, washing and drying steps follow as set forth above.

Sample E is blistered in appearance. Close inspection shows the blisters to be air bubbles. When the blister surface is opened, a hole or channel is found that leads down into the substrate fabric. Some areas of the surface show no air bubbles while the sample lies flat, but when it is flexed and folded over upon itself, surface imperfections are revealed which also turn out to be air bubbles under the polymer surface.

Sample F has a smooth appearance, unmarred by visible pits, blisters or air bubbles. It shows a density of 0.514, an MVT of 758/g./m.$^2$/24 hrs., and is usable as a shoe upper material. It flexes and can be folded upon itself with no effect on the surface appearance.

Example III

The DMF solution of polyesterurethane polymer from Example I is spread to a thickness of 35 mils on an impervious glass substrate. The polymer is precipitated from the solvent by immersion in a water bath. Continued washing extracts the last of the solvent and leaves a microporous film which can be dried and stripped from the glass substrate. An attempt to laminate this "preformed" film to a section of the vinylidene polymer impregnated nonwoven fabric of Example I, employing an adhesive layer, results in the formation of bubbles in the adhesive layer and under the top film that makes the product unsatisfactory. When the impregnated nonwoven fabric is first saturated with water, then squeezed to remove excess water droplets before the adhesive and preformed top film are laminated to the nonwoven, a structure with a smooth, bubble-free surface is obtained.

We claim:

1. In the method of making a leatherlike coating on a porous substrate, said substrate being impregnated with from 50% to 200% by weight of fiber with a synthetic polymer, comprising applying a polymer dissolved in an organic solvent thereto and extracting said solvent and coagulating said polymer into a microporous structure by immersion in a liquid bath, the improvement comprising first saturating said impregnated porous substrate with a liquid that is a nonsolvent for said polymer, but is miscible with said organic solvent whereby all air entrapped in said substrate is replaced by said saturant, then squeezing said saturated substrate to remove all free drops of said liquid from said saturated substrate.

2. In the method of making a leatherlike coating on a porous substrate comprising a nonwoven textile batt, said batt being impregnated with from 50% to 200% by weight of fiber with a synthetic polymer, comprising spreading a polyurethane dissolved in dimethylformamide thereon and coagulating said polyurethane and extracting said dimethylformamide to form a microporous film of said polyurethane by immersion in a water bath, the improvement comprising first saturating said impregnated nonwoven batt in water whereby all air entrapped in said batt is replaced by said water, then squeezing said saturated batt to remove any free droplets of water therefrom.

3. The method of claim 2 wherein the polyurethane employed to coat the impregnated fibrous substrate is a linear polyesterurethane comprising the reaction product of a linear hydroxyl terminated polyester with an aromatic diisocyanate and a saturated aliphatic free glycol and characterized by the absence of free isocyanate and hydroxyl groups.

References Cited

UNITED STATES PATENTS

| | | | |
|---|---|---|---|
| 2,657,151 | 10/1953 | Gensel et al. | 117—47 |
| 3,067,482 | 12/1962 | Hollowell | 117—63 X |
| 3,100,721 | 8/1963 | Holden | 117—135.5 |
| 3,180,853 | 4/1965 | Peters | 117—161 X |

WILLIAM D. MARTIN, Primary Examiner

T. G. DAVIS, Assistant Examiner

U.S. Cl. X.R.

117—63, 135.5, 140, 161